(12) United States Patent
Park et al.

(10) Patent No.: US 11,306,000 B2
(45) Date of Patent: Apr. 19, 2022

(54) GRAPHENE-BASED COMPOUND, PREPARATION METHOD THEREOF, AND SINGLE-PHASE COMPOSITION FOR PREPARING GRAPHENE-BASED COMPOUND AND GRAPHENE QUANTUM DOT

(71) Applicants: KOREA ADVANCED INSTITUTE OF SCIENCE AND TECHNOLOGY, Daejeon (KR); KOREA UNIVERSITY RESEARCH AND BUSINESS FOUNDATION, Seoul (KR)

(72) Inventors: O Ok Park, Daejeon (KR); Seok Hwan Lee, Gyeonggi-do (KR); Sang Hyuk Im, Seoul (KR)

(73) Assignees: KOREA ADVANCED INSTITUTE OF SCIENCE AND TECHNOLOGY, Daejeon (KR); KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 411 days.

(21) Appl. No.: 16/193,361

(22) Filed: Nov. 16, 2018

(65) Prior Publication Data
US 2019/0315626 A1 Oct. 17, 2019

(30) Foreign Application Priority Data

Apr. 12, 2018 (KR) .................. 10-2018-0042746
Sep. 6, 2018 (KR) .................. 10-2018-0106746

(51) Int. Cl.
*C01B 32/194* (2017.01)
*C09K 11/65* (2006.01)
(Continued)

(52) U.S. Cl.
CPC ............ *C01B 32/194* (2017.08); *C09K 11/65* (2013.01); *B82Y 20/00* (2013.01); *B82Y 40/00* (2013.01);
(Continued)

(58) Field of Classification Search
CPC . C01B 32/194; C01B 2204/22; C01B 32/184; C09K 11/65; B82Y 20/00;
(Continued)

(56) References Cited

FOREIGN PATENT DOCUMENTS

CN          1969899 A   *  5/2007
CN        106410146 A   *  2/2017   ........ H01M 10/0525
(Continued)

OTHER PUBLICATIONS

Wang, Fu, et al. "One-step synthesis of highly luminescent carbon dots in noncoordinating solvents." Chemistry of Materials 22.16 (2010): 4528-4530.*
(Continued)

*Primary Examiner* — Richard M Rump
(74) *Attorney, Agent, or Firm* — Nixon Peabody LLP; Thomas P. Pavelko

(57) ABSTRACT

Provided are a graphene-based compound, a preparation method thereof, a single-phase composition for preparing a graphene-based compound, and a graphene quantum dot. Specifically, provided are a graphene-based compound prepared from a single-phase composition for preparing a graphene-based compound including hydrocarbyl amine, a hydroxyl group-containing carbon source, and an acid, a preparation method thereof, a single-phase composition for preparing a graphene-based compound, and a graphene quantum dot.

11 Claims, 9 Drawing Sheets

(51) Int. Cl.
    *B82Y 20/00* (2011.01)
    *B82Y 40/00* (2011.01)
(52) U.S. Cl.
    CPC ...... *C01B 2204/22* (2013.01); *C01P 2002/82* (2013.01); *C01P 2002/84* (2013.01); *C01P 2002/85* (2013.01); *C01P 2004/04* (2013.01)
(58) Field of Classification Search
    CPC ..... B82Y 40/00; B82Y 30/00; C01P 2002/82; C01P 2004/04; C01P 2002/85; C01P 2002/84
    See application file for complete search history.

(56) References Cited

FOREIGN PATENT DOCUMENTS

| | | | | |
|---|---|---|---|---|
| JP | 2017036411 | A | 2/2017 | |
| KR | 20150125418 | A | 11/2015 | |
| KR | 20160003231 | A | 1/2016 | |
| KR | 20160025339 | A | 3/2016 | |
| KR | 20170082680 | A | 7/2017 | |
| KR | 20170093826 | A | 8/2017 | |
| KR | 20180076053 | A | 7/2018 | |
| WO | WO-9205152 | A2 * | 4/1992 | ............... C07H 9/04 |

OTHER PUBLICATIONS

English machine translation of JP2017036411A (Year: 2017).*
Korean Office Action for Application No. 10-2018-0106746, dated Jan. 16, 2020.
Liang Wang et al, "Gram-scale synthesis of single-crystalline graphene quantum dots with superior optical properties", Nature Communications, Published Oct. 28, 2014.
Korean Office Action for Application No. 10-2020-0107567, dated Sep. 3, 2020.
Yan Li et al, "Nitrogen-Doped Graphene Quantum Dots with Oxygen-Rich Functional Groups", Journal of the American Chemical Society (Dec. 2, 2011); J. Am. Chem.Soc. 2012, pp. 15-18, vol. 134.
Korean Notice of Allowance for Application No. 10-2020-0107567, dated Jun. 9, 2021.
Dan Qu, et al., entitled, "Formation Mechanism and Optimization of Highly Luminescent N-doped Graphene Quantum Dots," published Jun. 18, 2014, Scientific Reports 4:5294, pp. 1-11.
Ping Yang, et al., entitled, "Facile Synthesis and Photoluminescence Mechanism of Graphene Quantum Dots," Journal of Applied Physics 116 244306 (2014), published Dec. 29, 2014, pp. 1-7.
Koren Office Action for Application No. 10-2018-0042746, dated Jul. 6, 2018, 7 pages.

* cited by examiner

GRAPHENE-BASED COMPOUND, PREPARATION METHOD THEREOF, AND SINGLE-PHASE COMPOSITION FOR PREPARING GRAPHENE-BASED COMPOUND AND GRAPHENE QUANTUM DOT

CROSS-REFERENCE TO RELATED APPLICATIONS

This application claims priority under 35 U.S.C. § 119 to Korean Patent Application No. 10-2018-0042746, filed on Apr. 12, 2018, and Korean Patent Application No. 10-2018-0106746, filed on Sep. 6, 2018, in the Korean Intellectual Property Office, the disclosure of which is incorporated herein by reference in its entirety.

TECHNICAL FIELD

The following disclosure relates to a graphene-based compound, a preparation method thereof, a single-phase composition for preparing a graphene-based compound, and a graphene quantum dot.

BACKGROUND

Low-dimensional materials composed of carbon atoms include fullerene, carbon nanotube, graphene, graphite, and the like. When the carbon atoms are arranged in a hexagonal shape and form a ball shape, the carbon atoms may be classified into fullerene having a zero-dimensional structure, carbon nanotube if it is rolled in one-dimension, graphene if it forms one layer of atoms in two dimensions, and graphite if it is stacked in three dimensions.

Among them, graphene is not only very structurally and chemically stable, but also has remarkable conductivity due to its structural characteristics, which have a thickness of one layer of atoms and relatively small defects in a surface region. Theoretically, graphene is known to be a carbon-based material capable of moving electrons 100 times faster than silicon and allowing current to flow at an amount of about 100 times larger than copper.

Meanwhile, a quantum dot is a semiconducting nano-sized particle having a three-dimensionally limited size so that a particle size is smaller than a wavelength size, and exhibits excellent optical and electrical properties not possessed by semiconducting materials in a bulk state.

A semiconductor quantum dot is widely used in the field of bioimaging since it is possible to be monitored for a long time and a luminescent wavelength is constant. However, the most semiconductor quantum dot employs heavy metal materials having toxicity as core materials, and thus the use of the semiconductor quantum dot is limited despite its excellent properties. In particular, emission of heavy metals such as cadmium, lead, indium, selenium, and the like, which are poisonous materials, may cause serious environmental problems and health problems. This potential toxicity limits the use of the quantum dot for therapeutic purposes despite the physicochemical excellence thereof.

In order to solve these problems, researches on non-organic non-toxic luminescent materials have been attempted. For example, researches on a carbon quantum dot having excellent physical properties such as aqueous dispersion characteristics, chemical inertness, low photobleaching characteristics, and the like, have been attempted.

A carbon quantum dot has excellent physical properties such as aqueous dispersion properties, chemical inertness, and low photobleaching characteristics. As a synthesis method thereof, a microwave synthesis method, an electrochemical method, an incomplete oxidation method, a laser evaporation method, a plasma treatment method, a hydrothermal synthesis method, a chemical vapor deposition, and the like, have been studied. Even though various synthesis methods are known, there are problems such as low synthesis yield, low economic efficiency due to complicated manufacturing processes, low chemical stability, low quantum efficiency, or low quality of luminescence characteristics.

Accordingly, various methods have been studied to improve the luminescence characteristics of the carbon quantum dot, such as a method of oxidizing a surface by using nitric acid, a method of using a strong oxidizer such as potassium manganate, a method of treating a surface protective film, and the like. Meanwhile, factors affecting quantum efficiency of the carbon quantum dot may include ion doping, host material, size and shape of nanoparticles, surface defects, external environment, and the like. In particular, in order to increase the applicability of the carbon quantum dot, researches such as improvement of the synthesis method, development of a post-treatment process, and development of a complex with a heterogeneous element or a heterogeneous material have been attempted, but still have a problem of low quantum efficiency or low economic efficiency.

Even though the carbon quantum dot has high applicability in many fields, chemical synthesis methods capable of mass production uniformly have not been known, and the conventional production methods have problems in that a production efficiency is low, and it is very difficult to manufacture a uniform particle size, to control a particle size, and to minimize defects in a surface region.

Therefore, there is a need for an easy synthesis method capable of improving excellent luminescence characteristics and the quantum efficiency by controlling the size and shape of the carbon quantum dot.

SUMMARY

An embodiment of the present invention is directed to providing a graphene-based compound and a graphene quantum dot having excellent luminescence efficiency and excellent electrical conductivity.

Another embodiment of the present invention is directed to providing a graphene-based compound having a regular oxidation region of an edge region and a graphene quantum dot.

Still another embodiment of the present invention is directed to providing a single-phase composition for preparing a graphene-based compound capable of controlling a size and a shape and having excellent crystallinity.

Still another embodiment of the present invention is directed to providing a method for preparing a single solution phase for preparing a monodisperse and monocrystalline graphene-based compound.

Still another embodiment of the present invention is directed to providing a method for preparing a graphene-based compound capable of being simple in synthesis and separation and having excellent economic efficiency.

In one general aspect, a single-phase composition for preparing a graphene-based compound includes: hydrocarbyl amine, a hydroxyl group-containing carbon source, and an acid.

The hydroxyl group-containing carbon source may include a saccharide-based compound.

The saccharide-based compound may include a monosaccharide compound.

The acid may include an organic acid.

The single-phase composition for preparing a graphene-based compound may further include a hydrocarbyl alcohol-based solvent.

The hydrocarbyl alcohol-based solvent may include substituted or unsubstituted (C4-C20) alkyl alcohol, substituted or unsubstituted (C4-C20) alkenyl alcohol, or substituted or unsubstituted (C4-C20) alkynyl alcohol.

The hydrocarbyl amine may include substituted or unsubstituted (C3-C20) alkyl amine, substituted or unsubstituted (C3-C20) alkenyl amine, or substituted or unsubstituted (C3-C20) alkynyl amine.

The hydroxyl group-containing carbon source and the hydrocarbyl amine may be included in a molar ratio of 1:1 to 20.

The hydrocarbyl amine and the acid may be contained in a molar ratio of 1:0.2 to 2.

The pH of the composition may range from 4 to 7.

The composition may have an aqueous solution phase.

The graphene-based compound may include a graphene quantum dot.

In another general aspect, a method for preparing a graphene-based compound includes: (a) preparing a reaction mixture including hydrocarbyl amine, a hydroxyl group-containing carbon source, and an acid; and (b) heating the reaction mixture.

The reaction mixture may further include a hydrocarbyl alcohol-based solvent.

A reaction temperature in the (b) heating may range from 60 to 300° C.

The method may further include: mixing a reaction product obtained after the (b) heating with a (C1-C3) alcohol-based solvent.

The method may further include: cooling the reaction product obtained after the (b) heating to a melting point or less of the hydrocarbyl amine.

The reaction mixture of the (a) preparing may have a single phase.

In another general aspect, there is provided a graphene-based compound prepared by the method as described above.

The graphene-based compound may include a graphene quantum dot.

The graphene quantum dot may have an average particle diameter of 2 nm to 10 μm and a ratio of I(D)/I(G) of 1.0 or less.

The graphene quantum dot may include a carbonyl group or a —C—O group at an edge region of the graphene, and a nitrogen atom of the hydrocarbyl amine may be covalently bonded to a carbon atom of the edge region.

The graphene quantum dot may have a relative standard deviation (variation coefficient) of less than 10% with respect to a particle diameter distribution.

The graphene quantum dot may have a maximum luminescence characteristic at 380 to 480 nm at 300K on a methanol solvent.

The graphene quantum dot may have monocrystalline characteristics.

An exciton lifetime of the graphene quantum dot in a 5 mg/mL solution at 300K on a methanol solvent may be 4 ns or less.

An aspect ratio of a long axis length to the thickness of the graphene quantum dot may be 5 or more.

An emission maximum wavelength ($\lambda_{em}$) and an excitation wavelength ($\lambda_{ex}$) of PL on the methanol solvent at 300K of the graphene quantum dot satisfy Relational Expression 1 below:

$$\lambda_{em}=A\times\lambda_{ex}+B \quad \text{[Relational Expression 1]}$$

in Relational Expression 1, A is 0.59 and B ranges from 208.81 to 238.81.

The graphene quantum dot may exhibit a maximum PL at an excitation wavelength of 350 to 390 nm at 300K.

The graphene quantum dot may have a full width at half maximum (FWHM) of PL emission spectrum at 300K of 100 nm or less.

The graphene quantum dot may have a maximum emission wavelength showing a maximum PL curve at 300K ranging from 420 to 480 nm.

A diameter (Dp) and a carbon/oxygen atomic ratio (C/O ratio) of a graphene quantum dot molecule may satisfy Relational Expression 2 below:

$$C/O\ ratio=-0.221\times Dp+C \quad \text{[Relational Expression 2]}$$

in Relational Expression 2, the diameter (Dp) has a unit of nm, and the constant C ranges from 20.48 to 30.48.

The graphene quantum dot may contain oxygen in a content of 15 atom % or less in a molecule.

The graphene quantum dot may have a hexagonal array.

BRIEF DESCRIPTION OF THE DRAWINGS

FIG. 4A shows results of the graphene-based compound having an average particle diameter of 5 nm, and FIG. 4B shows results of the graphene-based compound having an average particle diameter of 70 nm.

FIG. 6A shows results of the graphene-based compound having an average particle diameter of 5 nm, and FIG. 6B shows results of the graphene-based compound having an average particle diameter of 70 nm.

FIGS. 8A-8 D shows results of time-resolved photoluminescence (TRPL) of the graphene-based compound according to an embodiment of the present invention, measured for each average particle diameter and each excitation wavelength. FIG. 8A shows the decay time (in ns) vs. Intensity and FIG. 8B shows the average particle size in a range of 10-70 nm. FIG. 8C shows the decay time (in ns) vs. Intensity and FIG. 8D shows the average particle size in a range of 10-70 nm.

DETAILED DESCRIPTION OF EMBODIMENTS

Figure 1:
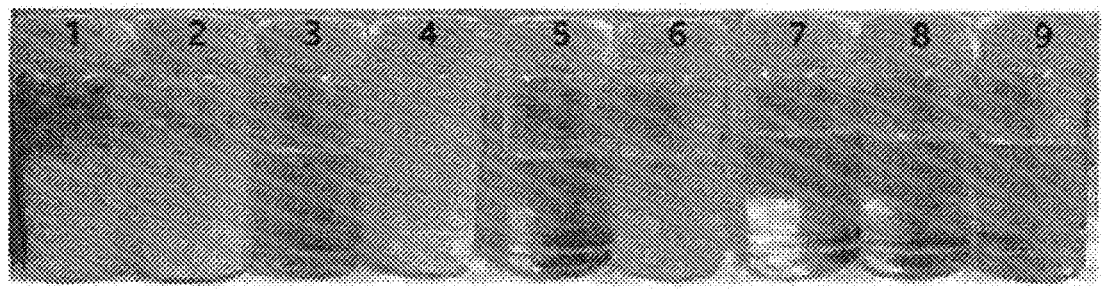
FIG. 1 is an image obtained by observing each single phase of a composition for preparing a graphene-based compound according to an embodiment of the present invention.

Hereinafter, a graphene-based compound, a preparation method thereof, a single-phase composition for preparing a graphene-based compound, and a graphene quantum dot will be described in detail with reference to the accompanying drawings. The drawings to be provided below are provided by way of example so that the idea according to the present invention can be sufficiently transferred to those skilled in the art to which the present invention pertains. Therefore, the present invention is not limited to the presented drawings below, and may be embodied in other forms. Also, the drawings presented below may be shown exaggerated in order to clarify the idea according to the present invention. Technical terms and scientific terms used in the present specification have the general meaning understood by those skilled in the art to which the present invention pertains unless otherwise defined, and a description for the known function and configuration obscuring the present invention will be omitted in the following description and the accompanying drawings.

In the present invention, unless otherwise defined, a percentage (%) or a ratio is interpreted to indicate wt % or a weight ratio.

The term "hydrocarbyl" used herein means a radical having one binding position derived from hydrocarbon, and specifically may be selected from an alkyl, a cycloalkyl, an aryl, an alkenyl, an alkynyl, and the like, or a combination thereof.

The term "substituted" used herein means substitution with one or more substituents selected from halogen, a hydroxyl group, a cyano group, a carboxyl group, a carboxylate, (C1-C20) alkyl, (C1-C20) alkoxy, (C2-C20) alkenyl, (C2-C20) alkynyl, (C6-C20) aryl, and (C6-C20) heteroaryl, and the like.

The present disclosure relates to a graphene-based compound, a preparation method thereof, a single-phase composition for preparing a graphene-based compound, and a graphene quantum dot.

Hereinafter, the single-phase composition for preparing a graphene-based compound according to the present invention will be described in detail.

The single-phase composition for preparing a graphene-based compound according to the present invention is provided for preparing a graphene-based compound, and includes hydrocarbyl amine, a hydroxyl group-containing carbon source, and an acid. In other words, a homogeneous single-phase composition may be prepared by combination of hydrocarbyl amine, a hydroxyl group-containing carbon source, and an acid.

The single-phase composition for preparing a graphene-based compound according to the present invention is capable of controlling a size and shape of the graphene-based compound and preparing a monocrystalline graphene-based compound having excellent crystallinity. Accordingly, it is possible to exhibit excellent luminescence efficiency and electrical characteristics beyond the limitations of existing graphene-based compounds.

The single phase refers to a homogeneous phase in which a dispersed phase such as an emulsion is excluded even if it is transparent in appearance.

Figure 10:
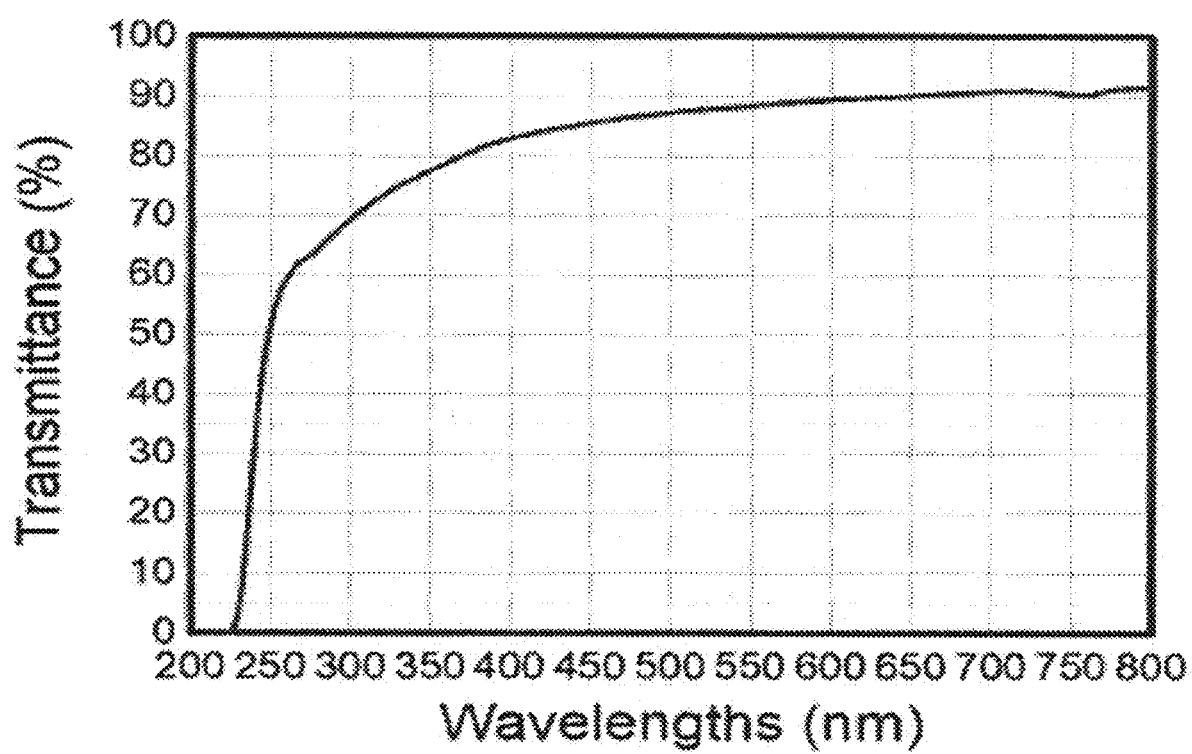
FIG. 10 shows UV-Vis-Transmittance results of the graphene-based compound according to an embodiment of the present invention.
Figure 11:
FIG. 11 is an image of a transparent and colorless single phase of a composition for preparing a graphene-based compound according to an embodiment of the present invention, observed with the naked eye.

According to an embodiment of the present invention, the single-phase composition for preparing a graphene-based compound may have a transmittance of 80% or more in a wavelength region of 450 to 800 nm. Preferably, the transmittance may be 85% or more. The single-phase composition for preparing a graphene-based compound according to the present invention may be confirmed to have the above-described transmittance as shown in FIG. 10, and to form a colorless transparent single phase as shown in FIG. 11 since there is no shoulder peak, and the like.

According to an embodiment of the present invention, the hydrocarbyl amine may include substituted or unsubstituted (C3-C20) alkylamine, substituted or unsubstituted (C3-C20) alkenylamine or substituted or unsubstituted (C3-C20) alkynylamine. Preferably, the hydrocarbyl amine may include substituted or unsubstituted (C4-C20) alkylamine, substituted or unsubstituted (C4-C20) alkenylamine or substituted or unsubstituted (C4-C20) alkynylamine.

Preferably, the hydrocarbyl amine may be linear and may be a primary amine ($R-NH_2$). Specific examples of the hydrocarbyl amine may include any one or a mixture of two or more selected from butylamine, hexylamine, dodecylamine, nonylamine, decylamine, undecylamine, tridecylamine, tetradecylamine, pentadecylamine, hexadecylamine, heptadecylamine, octadecylamine, and the like.

These amines have difficulty in preparing a single-phase composition since they are close to hydrophobic. However, the single phase may be formed by combination of compositions according to the present invention.

In addition, by including the hydrocarbyl amine as described above, a covalent bond may be formed through a polar interaction with the hydroxyl group-containing carbon source, and a single phase may be more stably formed when forming a single-phase composition, and thus a monocrystalline graphene-based compound having a high degree of crystallinity is capable of being prepared through a subsequent heat treatment.

According to an embodiment of the present invention, the hydroxyl group-containing carbon source may include a saccharide-based compound. The saccharide-based compound may include any one or a mixture of two or more selected from, for example, a monosaccharide compound, a disaccharide compound, an oligosaccharide compound, a polysaccharide compound, and the like. Preferably, the saccharide-based compound may include a monosaccharide compound.

The monosaccharide compound may be classified into diose, triose, tetrose, pentose, hexose, and the like, depending on the number of carbon atoms. In order to provide the monocrystalline graphene-based compound according to the present invention, preferably, a hexasaccharide may be included. The hexose may include any one or a mixture of two or more selected from, for example, glucose, fructose, galactose, mannose, and the like.

When the above-described hydroxyl group-containing carbon source is included in the composition, a single phase may be easily formed in a solution, and polar interaction and covalent bonding with the hydrocarbyl amine may be induced in the single-phase composition. As described above, the hydroxyl group-containing carbon source may form the covalent bond with the hydrocarbyl amine in the single-phase composition, an amadori rearrangement may be easily induced, and a monocrystalline graphene-based compound having a high degree of crystallinity may be prepared through a subsequent heat treatment process. Further, it is possible to prepare a graphene-based compound having a regular oxidation region of an edge region, thereby exhibiting excellent luminescence characteristics.

According to an embodiment of the present invention, the hydroxyl group-containing carbon source may be included in a content of 0.01 to 20 wt % based on the total weight of the single-phase composition for preparing a graphene-based compound, but the content thereof is not limited thereto. As a non-limiting example, the hydroxyl group-containing carbon source may be included in a content of 1 to 18 wt %, preferably 5 to 15 wt %. When the hydroxyl group-containing carbon source is included in the above-described range, a graphene-based compound may be obtained in a high yield, and a graphene-based compound having a uniform shape may be obtained.

According to an embodiment of the present invention, the hydroxyl group-containing carbon source and the hydrocarbyl amine may be included in a molar ratio of 1:1 to 20 in the single-phase composition for preparing a graphene-based compound. Preferably, the molar ratio thereof may be 1:2 to 10, and more preferably 1:4 to 10. When the composition includes the hydroxyl group-containing carbon source and the hydrocarbyl amine within the above-described contents, the polar interaction between the hydroxyl group-containing carbon source and the hydrocarbyl amine may be the most effectively induced, and may be stably included in the single phase, thereby easily preparing the graphene-based compound and improving the yield of the graphene-based compound.

According to an embodiment of the present invention, the hydroxyl group-containing carbon source may be provided as an aqueous solution. Thus, the single-phase composition for preparing a graphene-based compound according to the present invention may be provided in an aqueous solution phase.

By the conventional methods for preparing a monocrystalline graphene-based compound, a liquid phase process is not capable of being performed, or an unstable phase may be formed in the aqueous solution, thereby resulting in phase separation, and an emulsion structure such as an emulsion may be formed. However, the present invention may form a stable aqueous liquid phase to enable stable preparation of the graphene-based compound and formation of the monocrystalline graphene-based compound having a higher degree of crystallinity.

According to an embodiment of the present invention, the acid may include an organic acid. The organic acid may be (C1-C8) organic acid, and one or more acid groups may be included in one molecule. Preferably, the organic acid may be (C1-C3) organic acid. Specific examples thereof may include, but are not limited to, any one or a mixture of two or more selected from acetic acid, formic acid, propionic acid, and the like. Preferably, the organic acid may be acetic acid in order to effectively form a single phase, inhibit side reactions, and obtain a monocrystalline and monodisperse graphene-based compound.

When the organic acid is included, it is possible to provide a stable and homogeneous single-phase composition, to obtain the monodisperse graphene-based compound in a high yield without phase separation at the time of subsequent heat treatment of the composition, and to prepare a monocrystalline graphene-based compound having excellent luminescence characteristics in which a full width at half maximum (FWHM) is narrow.

A reactive composition according to the conventional preparation method of a graphene-based compound has problems in that it is difficult to be provided in a single phase, a production efficiency is low, and it is difficult to artificially control a particle size, a surface state, and the like. On the contrary, the present disclosure provides a stable and homogeneous single phase composition to provide the monocrystalline graphene-based compound with a high degree of crystallinity and to implement excellent luminescence and electrical characteristics.

According to an embodiment of the present invention, the hydrocarbyl amine and the acid may be included in a molar ratio of 1:0.2 to 2 in the single-phase composition for preparing a graphene-based compound. Preferably, the molar ratio thereof may be 1:0.3 to 2. When the composition includes the hydrocarbyl amine and the acid within the above-described contents, the acid may accelerate a reaction of the hydrocarbyl amine with the hydroxyl group-containing carbon source, and induce growth into monocrystal.

According to an embodiment of the present invention, the single-phase composition for preparing a graphene-based compound may further include a hydrocarbyl alcohol-based solvent. The hydrocarbyl alcohol-based solvent may be preferably a (C4-C20) hydrocarbyl alcohol-based solvent.

The hydrocarbyl alcohol-based solvent according to an embodiment of the present invention may include, for example, substituted or unsubstituted (C4-C20) alkyl alcohol, substituted or unsubstituted (C4-C20) alkenyl alcohol, or substituted or unsubstituted (C4-C20) alkynyl alcohol. Preferably, the hydrocarbyl alcohol-based solvent may include substituted or unsubstituted (C4-C10) alkyl alcohol, substituted or unsubstituted (C4-C10) alkenyl alcohol, or substituted or unsubstituted (C4-C10) alkynyl alcohol. More preferably, the hydrocarbyl alcohol-based solvent may include substituted or unsubstituted (C4-C7) alkyl alcohol, substituted or unsubstituted (C4-C7) alkenyl alcohol, or substituted or unsubstituted (C4-C7) alkynyl alcohol. Specific examples thereof may include any one or a mixed solvent of two or more selected from, for example, n-butanol, isobutanol, sec-butanol, tert-butanol, n-pentanol, isopentanol, sec-pentanol, tert-pentanol, hexanol, heptanol, octanol, nonanol, decanol, undecanol, dodecanol, pentadecanol, and the like. In order to provide a more homogeneous single-phase composition, preferably, the hydrocarbyl alcohol-based solvent may be any one or a mixed solvent of two or more selected from n-butanol, isobutanol, sec-butanol, tert-butanol, n-pentanol, isopentanol, sec-pentanol, tert-pentanol, hexanol, and the like. When the above-described hydrocarbyl alcohol-based solvent is included, it is possible to control acidity to activate the reaction of the hydrocarbyl amine, the hydroxyl group-containing carbon source, and the acid, thereby providing a highly crystalline graphene-based compound.

According to an embodiment of the present invention, the pH of the single-phase composition for preparing a graphene-based compound may range from 4 to 7. Preferably, the pH may range from 4.5 to 6.5. When the composition has the above-described pH, it is possible to inhibit side reactions when preparing the graphene-based compound.

Hereinafter, a method for preparing a graphene-based compound according to the present invention is described in detail.

The method for preparing a graphene-based compound may include: (a) preparing a reaction mixture including hydrocarbyl amine, a hydroxyl group-containing carbon source, and an acid; and (b) heating the reaction mixture.

According to an embodiment of the present invention, the method for preparing the graphene-based compound may be performed at normal pressure. Unlike a slow crystal growth rate with a hydrothermal reaction at high pressure, when the method is performed at normal pressure, a homogeneous and monocrystalline graphene-based compound while having a fast crystal growth rate may be produced.

According to an embodiment of the present invention, the reaction mixture of step (a) may be prepared as a stable and homogeneous single phase by mixing the hydrocarbyl amine, the hydroxyl group-containing carbon source, and the acid.

According to an embodiment of the present invention, the reaction mixture of step (a) may be further subjected to a heating step. The heating temperature may be 60 to 100° C. Preferably, the heating temperature may be 60 to 90° C. The heating as described above may induce a partially non-uniform reaction mixture to form a homogeneous single phase, thereby preparing a monocrystalline and monodisperse graphene-based compound.

The reaction mixture according to an embodiment of the present invention may further include a hydrocarbyl alcohol-based solvent. By further including the hydrocarbyl alcohol-based solvent as described above, it is possible to activate the reaction of the hydrocarbyl amine, the hydroxyl group-containing carbon source, and the acid, thereby preparing the monocrystalline graphene-based compound. Further, the size of the graphene-based compound is able to be controlled, and the graphene-based compound may be provided into a monodisperse form.

The hydrocarbyl alcohol-based solvent may be preferably (C4 to C20) hydrocarbyl alcohol-based solvent, and may include, for example, substituted or unsubstituted (C4-C20) alkyl alcohol, substituted or unsubstituted (C4-C20) alkenyl alcohol, or substituted or unsubstituted (C4-C20) alkynyl alcohol. Preferably, the hydrocarbyl alcohol-based solvent may include substituted or unsubstituted (C4-C10) alkyl alcohol, substituted or unsubstituted (C4-C10) alkenyl alcohol, or substituted or unsubstituted (C4-C10) alkynyl alcohol. More preferably, the hydrocarbyl alcohol-based solvent may include substituted or unsubstituted (C4-C7) alkyl alcohol, substituted or unsubstituted (C4-C7) alkenyl alcohol or substituted or unsubstituted (C4-C7) alkynyl alcohol. Specific examples thereof may include any one or a mixed solvent of two or more selected from, for example, n-butanol, isobutanol, sec-butanol, tert-butanol, n-pentanol, isopentanol, sec-pentanol, tert-pentanol, hexanol, heptanol, octanol, nonanol, decanol, undecanol, dodecanol, pentadecanol, and the like. In order to provide a graphene-based compound having a higher degree of crystallinity, preferably, the hydrocarbyl alcohol-based solvent may be any one or a mixed solvent of two or more selected from n-butanol, isobutanol, sec-butanol, tert-butanol, n-pentanol, isopentanol, sec-pentanol, tert-pentanol, hexanol, and the like.

According to an embodiment of the present invention, a reaction temperature at the time of heating in step (b) is not particularly limited, but the reaction temperature may be 60 to 300° C. Preferably, the reaction temperature may be 60 to 200° C.

The reaction time is not limited, and may be 30 minutes to 10 hours. Preferably, the reaction time may be 30 minutes to 5 hours, and an average particle diameter of the graphene-based compound is capable of be controlled depending on the reaction temperature. Specifically, particles having a small average particle diameter may be produced at a high temperature and particles having a large average particle diameter may be produced at a low temperature.

The method may further include a step of mixing a reaction product obtained after the (b) heating with a (C1-C3) alcohol-based solvent. Specific examples of the (C1-C3) alcohol-based solvent may include any one or a mixture of two or more selected from methanol, ethanol, propanol, isopropanol, and the like. The reaction may be stopped by mixing the reaction product with the (C1-C3) alcohol-based solvent as described above.

According to an embodiment of the present invention, the method may further include: cooling the reaction product obtained after the (b) heating to a melting point or less of the hydrocarbyl amine. The reaction product obtained by the hydrothermal reaction, or the like, which is performed at high temperature and high pressure, has a low yield according to a complicated purification process such as dialysis, or the like, whereas the yield may be further improved by cooling the reaction product according to the present invention to precipitate hydrocarbyl amine in the single-phase reaction product, thereby extracting the hydrocarbyl amine through removal with solid-phase unreacted amine.

The graphene-based compound prepared by the above-described preparation method according to the present invention may include a graphene quantum dot having excellent luminescence characteristics.

The graphene quantum dot according to the present invention may have an average particle diameter of 2 nm to 10 μm. Preferably, the graphene quantum dot may have an average particle diameter of 2 nm to 2 μm, and more preferably 2 nm to 500 nm. The graphene quantum dot according to the present invention may have a wide range of average particle diameter.

The graphene quantum dot according to the present invention is prepared from the single-phase composition including the hydrocarbyl amines, the hydroxyl group-containing carbon source, and the acid. More specifically, the graphene quantum dot having excellent luminescence characteristics may be prepared through covalent bonding with the hydrocarbyl amine and the hydroxyl group-containing carbon source, the amadori rearrangement, and subsequent heat treatment processes.

The kind, the content, and the like, of the hydrocarbyl amine, the hydroxyl group-containing carbon source, and the acid, are the same as described above, and thus detailed descriptions thereof are omitted.

According to an embodiment of the present invention, an aspect ratio (L/T) of a long axis length L to the thickness T of the graphene quantum dot may be 5 or more. The aspect ratio may be specifically from 5 to 1,000, and preferably from 10 to 1,000. When the aspect ratio satisfies the above-described range, the luminescence effect may be maximized, the monocrystalline characteristics may be obtained, and excellent luminescence efficiency and electrical characteristics may be exhibited.

The graphene quantum dot according to the present invention may have a ratio of I(D)/I(G) of 1.0 or less. Here, the lower limit of I(D)/I(G) is not particularly limited, but may preferably be 0.3 or more.

Figure 5:
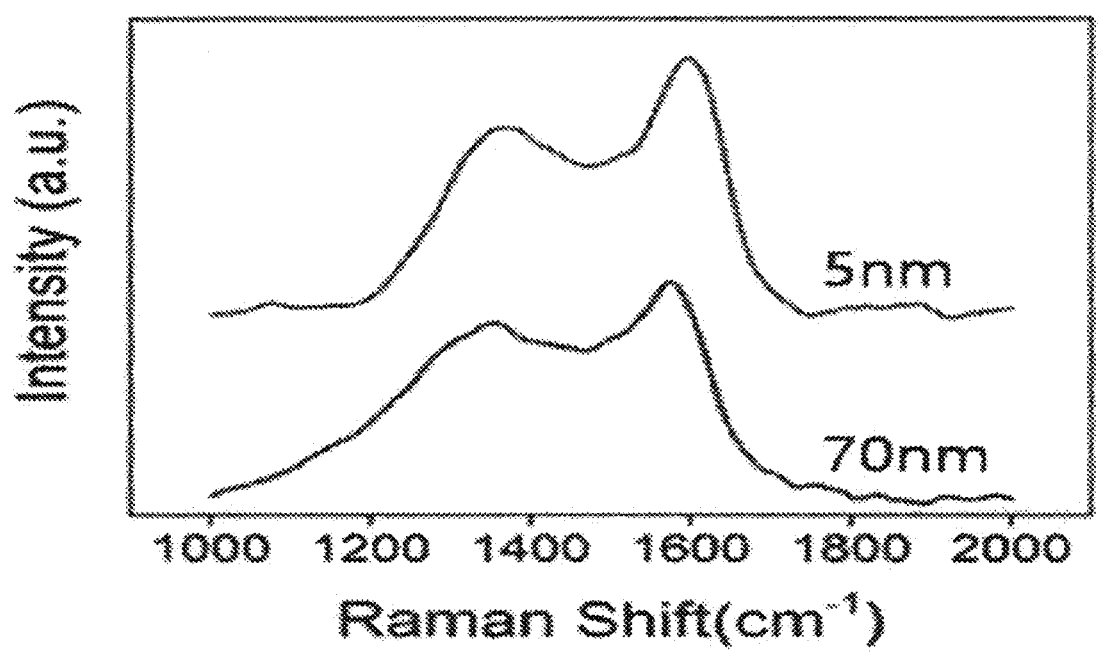
FIG. 5 shows results of Raman spectroscopy of a graphene-based compound having an average particle diameter of 5 nm or 70 nm according to an embodiment of the present invention.

Specifically, as shown in FIG. 5, I(D) representing the degree of defect in a surface region in the Raman spectrum is the maximum peak intensity (a.u.) of the D band shown at 1300 to 1400 $cm^{-1}$, and I(G) is the maximum peak intensity (a.u.) of the G band shown at 1550 to 1650 $cm^{-1}$.

The description in which the graphene quantum dot has the ratio of the I(D)/I(G) as described above means that a graphene quantum dot substantially free from defects is produced. The existing quantum dot has problems in that crystal defects frequently occur since distribution of atoms positioned on the surface is very large as compared to bulk, and electrons are easily lost due to a high energy state. On the contrary, the graphene quantum dot according to the present invention is substantially free from defects, thereby remarkably improving the luminescence efficiency.

Here, the description "substantially free from defects" means to include not only the absence of defects in the surface region but also a case in which most the functional groups by an oxidation reaction are present in the edge region, and a small amount of the functional groups is present or is rarely present in the surface region.

As an example, as shown in FIG. 5, even though the graphene quantum dot according to the present invention is produced by changing the size of the graphene quantum dot, it may be confirmed that the graphene quantum dot according to the present invention is substantially free from defects.

According to an embodiment of the present invention, the graphene quantum dot may include a carbonyl group or a —C—O group at the edge region of the graphene, and a nitrogen atom of the hydrocarbyl amine may be covalently bonded to a carbon atom of the edge region.

As described above, the graphene quantum dot may grow by covalent bonding of the carbonyl group or the —C—O group present in the edge region of the graphene quantum dot and the amine group of the hydrocarbyl amine.

According to an embodiment of the present invention, the graphene quantum dot may have a relative standard deviation (variation coefficient) of less than 10% with respect to a particle diameter distribution. Preferably, the graphene quantum dot may have a relative standard deviation (variation coefficient) of less than 8%. The description in which the graphene quantum dot has a low relative standard deviation as described above means that the graphene quantum dot has monodispersibility. By exhibiting the monodispersibility as described above, the graphene quantum dot may be stable and may implement excellent luminescence characteristics and electrical characteristics.

Here, the relative standard deviation (variation coefficient) means a ratio with respect to an average value of the standard deviation or a coefficient indicating reproducibility of the apparatus, and generally means relative scattering.

According to an embodiment of the present invention, the graphene quantum dot may have a maximum luminescence characteristic at 380 to 480 nm at 300K on a methanol solvent. Specifically, the graphene quantum dot may have a maximum emission wavelength showing a maximum PL curve at 300K ranging from 420 to 480 nm. The graphene quantum dot according to the present invention may have the same emission wavelength region even when a wide range of excitation wavelengths are applied. In the conventional graphene quantum dot, the PL emission wavelength deviates to the luminescent region of other colors, except for blue luminescence, according to the wavelength range of the excitation wavelength due to a number of defects, and the like, in the graphene. In contrast, the graphene quantum dot according to the present invention may stably have the maximum luminescence characteristics within the above-described range even when the excitation wavelength changes, and thus the graphene quantum dot may preferably exhibit blue luminescence characteristic. In order to clearly exhibit the blue luminescence characteristic, defects in the graphene quantum dot should be small. The graphene quantum dot according to the present invention may be substantially free from defects, thereby exhibiting excellent blue luminescence characteristic.

According to an embodiment of the present invention, the graphene quantum dot may specifically exhibit the maximum PL (photoluminescence) at an excitation wavelength of 350 to 390 nm at 300K. Preferably, the graphene quantum dot may exhibit the maximum PL at an excitation wavelength of 355 to 380 nm at 300K. When the quantum dot receives light from the excitation wavelength and reaches an energy-excited state, energy corresponding to the energy band gap may be emitted to exhibit the maximum PL.

According to an embodiment of the present invention, an emission maximum wavelength ($\lambda_{em}$) and an excitation wavelength ($\lambda_{ex}$) of PL at 300K of the graphene quantum dot on the methanol solvent may satisfy Relational Expression 1 below:

$$\lambda_{em} = A \times \lambda_{ex} B \quad \text{[Relational Expression 1]}$$

in Relational Expression 1, A is 0.59 and B ranges from 208.81 to 238.81. Preferably, B ranges from 213.81 to 235.81. The graphene quantum dot according to the present invention may exhibit monocrystallinity and monodispersibility to thereby satisfy the above-described Relational Expression 1.

According to an embodiment of the present invention, the graphene quantum dot may have an excitation wavelength of 340 to 380 nm, and a full width at half maximum (FWHM) of PL emission spectrum at 300K of 100 nm or less. Preferably, the excitation wavelength may be 350 to 370 nm, and the FWHM of the PL emission spectrum at 300 K may be 100 nm or less. Since the graphene quantum dot has the above-described narrow FWHM, it may exhibit luminescence characteristics having high color purity.

According to an embodiment of the present invention, the graphene quantum dot may be produced in the single-phase composition to have monocrystalline characteristics. As the graphene quantum dot has the monocrystalline characteristics as described above, luminescence characteristics and electrical characteristics may be remarkably improved by electron movement.

According to an embodiment of the present invention, an exciton lifetime using excitation light having a wavelength of 280 nm and 350 nm in a 5 mg/mL solution on a methanol solvent at 300K of the graphene quantum dot may be 4 ns or less. When the above-described short exciton lifetime is achieved, it is possible to obtain excellent luminescent quantum efficiency.

In the graphene quantum dot according to an embodiment of the present invention, a diameter (Dp) and a carbon/oxygen atomic ratio (C/O ratio) of a graphene quantum dot molecule may satisfy Relational Expression 2 below:

$$C/O \text{ ratio} = -0.221 \times Dp + C \quad \text{[Relational Expression 2]}$$

in Relational Expression 2, the diameter (Dp) has a unit of nm, and the constant C has a range of 20.48 to 30.48. Preferably the constant C ranges from 22.48 to 28.48.

The graphene quantum dot according to the present invention is substantially substantially free from defects, and thus the above-described Relational Expression 2 may be satisfied. Accordingly, excellent luminescence efficiency may be obtained.

The graphene quantum dot according to an embodiment of the present invention may contain oxygen in a content of 15 atom % or less in a molecule. Preferably, the oxygen content may be 10 atom % or less. The high oxygen content means that a large amount of an oxidation region is present even in the surface area. Unlike the conventional graphene quantum dots in which the oxygen content maintains 40 to 50 atom %, the graphene quantum dot according to the present invention may have a small oxygen content, which means that there is substantially no oxidation region in the surface region except for the oxidation region of the edge region, and thus it is possible to implement the graphene quantum dot having high crystallinity. Further, the graphene quantum dot according to the present invention has a high water dispersion property and a high quantum efficiency despite having a low oxygen content as described above, which means that there are substantially no defects in the surface region of the graphene quantum dot, and the existing and oxidized functional groups are present in the edge region.

Further, in the graphene quantum dot according to an embodiment of the present invention, the peak does not occur unlike the conventional graphene quantum dots which have an epoxide stretching peak shown in a range of 840 to 850 $cm^{-1}$ in the FT-IR spectrum including an epoxide oxidation region generated by oxidation of the surface region of the conventional graphene quantum dot. Further, when the average particle diameter of the graphene quantum dot is small, there is no peak, and when the average particle diameter thereof increases, the above-described epoxide peaks partially occur, but these peaks are ones that are substantially free from defects.

According to an embodiment of the present invention, the graphene quantum dot may satisfy Relational Expression 3 below in the FT-IR spectrum:

$$I_{CC}/I_{OH} > 1.6$$ [Relational Expression 3]

in Relational Expression 3, the $I_{CC}$ is the maximum intensity absorption peak height of the aromatic ring C=C stretch shown in a range of 1560 to 1760 $cm^{-1}$ and the —OH is the maximum intensity absorption peak height of —OH shown in the range of 3200 to 3600 $cm^{-1}$.

Preferably, the above-described Relational Expression 3 may satisfy 1.8 or more, and more preferably 1.9 or more. When Relational Expression 3 is satisfied as described above, there are substantially no defects in the graphene quantum dots, and a more excellent luminescence efficiency may be obtained. According to an embodiment of the present invention, in the graphene quantum dot, a full width at half maximum (FWHM) of the maximum intensity absorption peak of the aromatic ring C=C stretch shown in a range of 1560 to 1760 $cm^{-1}$ in the FT-IR spectrum may be 100 $cm^{-1}$ or less. Preferably, the full width at half maximum (FWHM) of the maximum intensity absorption peak of the aromatic ring C=C stretch shown in a range of 1560 to 1760 $cm^{-1}$ in the FT-IR spectrum may be 70 $cm^{-1}$ or less. Since the FWHM is narrow as described above, the graphene quantum dot having a very high degree of crystallinity may be provided.

According to an embodiment of the present invention, the graphene quantum dot may have an amphipathic property that is dissolved in both a non-polar solvent and a polar solvent. More specifically, when the graphene quantum dot is dissolved at a concentration of 10 mg/ml at 300 K, the graphene quantum dot may have the amphipathic property that is dissolved in all of a non-polar solvent, a polar solvent, and a mixed solvent thereof.

The non-polar solvent may be any one or a mixture of two or more selected from (C6-C20) alkane, amide-based, (C6-C20) aromatic solvents, halogenated solvents, and the like. Specific examples thereof may include any one or a mixture of two or more selected from hexane, heptane, octane, dimethylformamide, dimethylacetamide, N-methylpyrrolidone, tetrahydrofuran, dichlorobenzene, chloroform, chlorobenzene, and the like.

The polar solvent may be any one or a mixed solvent of two or more selected from, for example, (C4-C20) alkyl alcohol, substituted or unsubstituted (C4-C20) alkenyl alcohol, substituted or unsubstituted (C4-C20) alkynyl alcohol, and the like. Specific examples thereof may include any one or a mixed solvent of two or more selected from, for example, methanol, ethanol, propanol, butanol, pentanol, hexanol, heptanol, octanol, nonanol, decanol, undecanol, dodecanol, and the like. However, water in the polar solvent is excluded.

The graphene quantum dot may be grown into the form of a single crystal to exhibit non-polarity since the surface region thereof is substantially free from defects and to exhibit polarity by forming —OH or —COOH at the edge region. It is difficult to supply the conventional graphene quantum dots to various solution processes, and the like, since they are dissolved only in a polar solvent. In contrast, a graphene quantum dot having the amphipathic property that is dissolved in both non-polar solvent and polar solvent may be easily applicable to a solution process using various solvents, which may be confirmed that it is a graphene quantum dot having a very high degree of crystallinity.

According to an embodiment of the present invention, the graphene quantum dot may have a hexagonal structure. The hexagonal structure as described above may achieve a uniform hexagonal array when the graphene quantum dot is applied on a substrate. By forming the hexagonal array as described above, the graphene quantum dot may be packed at a high density to have more excellent luminescence efficiency.

Hereinafter, the graphene-based compound, the preparation method thereof, the single-phase composition for preparing a graphene-based compound, and the graphene quantum dot according to the present invention are described in more detail with reference to Examples below. It should be understood, however, that the following examples are only illustrative of the present invention in detail, and the present invention is not limited thereto, and may be implemented in various forms.

In addition, unless defined otherwise, all technical and scientific terms used herein have the same meanings as commonly understood by one of those skilled in the art to which the present disclosure pertains. Terms used herein have purposes of describing particular embodiments only and are not intended to limit the present invention.

In addition, additives that are not specifically described in the specification may have a unit of wt %.

Example 1

10 ml of 1-hexanol was bubbled with nitrogen at ml/min for 1 hour. Thereafter, 1 ml of an aqueous solution containing 10 wt % of D-glucose dissolved therein was further added, the supply of nitrogen was stopped, and the mixture was stirred at 80° C. for 1 hour. After stirring, 800 mg of 1-hexadecylamine and 200 mg of acetic acid were further added. Nitrogen was again added at 80 ml/min and the mixture was stirred at 150° C. for 1 hour. The stirred composition was washed with methanol, and subjected to ultrasonication. After cooling at −25° C. for 6 hours, the composition was filtered through a PTFE 0.22 μm membrane to obtain a supernatant, thereby obtaining a graphene-based compound having an average particle diameter of 5 nm.

[Experimental Example 1] Confirmation of Dispersion Phase of Composition

Compositions were prepared by changing the kinds of hydrocarbyl amine, hydrocarbyl alcohol-based solvent and acid as shown in Table 1, and it was confirmed whether these prepared compositions had a single phase.

TABLE 1

| Sample No. | Acid | Solvent | Amine |
| --- | --- | --- | --- |
| 1 | Nitric acid | Hexanol | Hexadecylamine |
| 2 | Oxalic acid | Hexanol | Hexadecylamine |
| 3 | Formic acid | Hexanol | Hexadecylamine |
| 4 | Citric acid | Hexanol | Hexadecylamine |
| 5 | Acetic acid | Butanol | Hexadecylamine |
| 6 | Acetic acid | Heptanol | Hexadecylamine |
| 7 | Acetic acid | Hexanol | Butylamine |
| 8 | Acetic acid | Hexanol | Hexylamine |
| 9 | Acetic acid | Hexanol | Dodecylamine |

As shown in FIG. 1, a transparent single phase composition was provided when formic acid was used instead of acetic acid, whereas opaque dispersed compositions were provided when oxalic acid, nitric acid and citric acid were used. Accordingly, it could be confirmed that when the composition for preparing a graphene-based compound according to the present invention included (C1-C3) organic acid, it was possible to provide a monocrystalline graphene-based compound having a higher degree of crystallinity by implementing a single phase. Further, it could be confirmed that at the time of including heptanol in which the number of carbon atoms of the hydrocarbyl alcohol-based solvent is 7 or more, a slightly non-uniform composition was provided. When the graphene-based compound was prepared from a composition that was not prepared in a single phase as described above, the degree of crystallization of the graphene-based compound was reduced, which failed to have monocrystallinity, and a graphene-based compound having a monodispersed constant size and shape was not prepared.

In addition, it could be confirmed that in the case of hydrocarbyl amine, even when using various amines ranging from butylamine to dodecylamine, a stable and homogeneous single-phase compositions were also prepared, and the graphene-based compounds prepared from these compositions had excellent monocrystallinity and monodispersibility.

In other words, it could be confirmed that the composition for preparing a graphene-based compound according to the present invention included the acid to induce polar interaction and covalent bonding between the hydrocarbyl amine and the hydroxyl group-containing carbon source, thereby providing a single-phase composition, whereby the monocrystalline graphene compound having a high degree of crystallinity could be prepared.

[Experimental Example 2] Observation of Shape of Graphene-Based Compound

Figure 2:
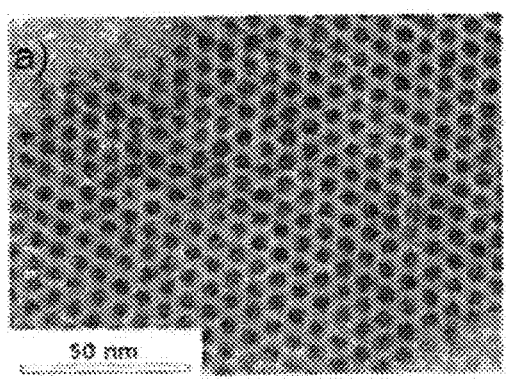
FIGS. 2A, 2C, and 2D are transmission electron microscope (TEM) images of the graphene-based compound according to an embodiment of the present invention.
FIG. 2B is a graph showing a standard deviation with respect to a particle diameter distribution of the graphene-based compound.
Figure 2:
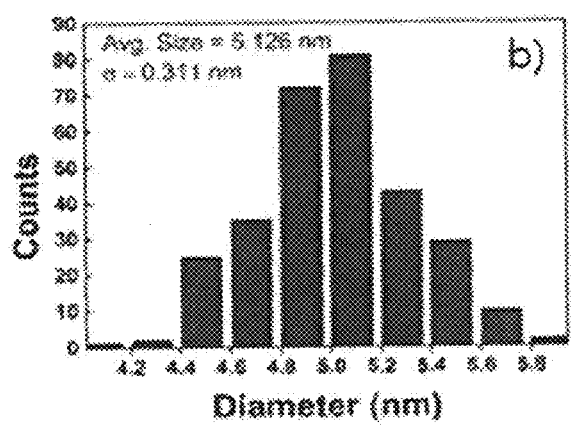
Figure 2:
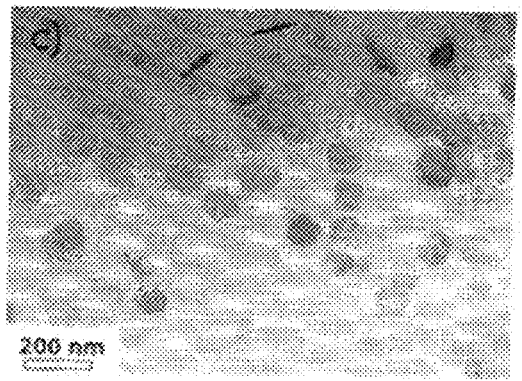
Figure 2:
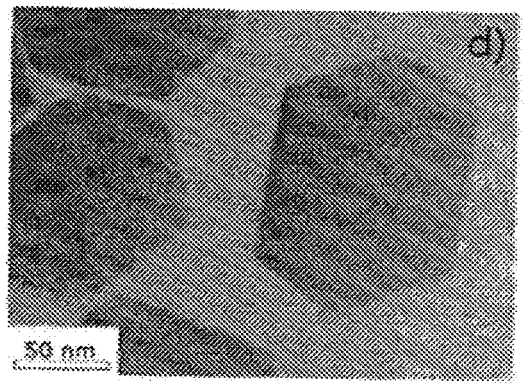

As shown in FIG. 2, it could be confirmed that the graphene-based compound prepared in Example 1 had monodispersibility having a uniform size and shape. As shown in FIG. 2, it could be confirmed that the graphene-based compound prepared in Example 1 had a hexagonal structure, and formed a hexagonal array according to the hexagonal structure as shown in FIG. 2a). In addition, it could be confirmed from FIG. 2b) that the standard deviation of the particle diameter distribution was 6.07%, which was less than 7%.

Figure 3:
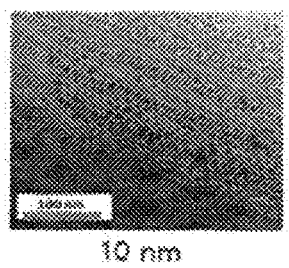
FIGS. 3A-3D are an image showing a size of the graphene-based compound according to an embodiment of the present invention, which varies depending on a reaction temperature, observed by TEM.
Figure 3:
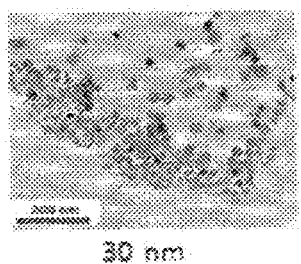
Figure 3:
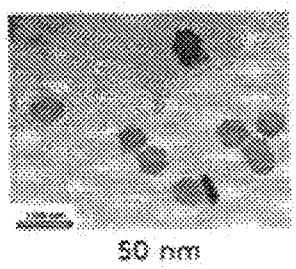
Figure 3:
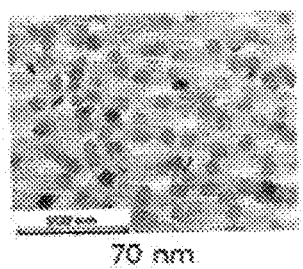

As shown in FIG. 3, when the reaction temperature of 150° C. in Example 1 was changed to 140, 135, 130 and 120° C., and then the graphene-based compounds prepared in Example 1 were observed with a transmission electron microscope (TEM, JEM-3011 HR, JEOL), it could be confirmed that the graphene-based compounds were prepared to have a predetermined size and shape. The reaction temperature was 140° C. when the average particle diameter was 10 nm, the reaction temperature was 135° C. when the average particle diameter was 30 nm, the reaction temperature was 130° C. when the average particle diameter was 50 nm, and the reaction temperature was 120° C. when the average particle diameter was 70 nm. As described above, it could be confirmed that the size of the graphene-based compound was capable of being controlled according to the reaction temperature, and that even when the reaction temperature was changed, the graphene-based compound having a uniform shape was capable of being provided.

[Experimental Example 3] Confirmation of Structure of Graphene-Based Compound

Figure 4:
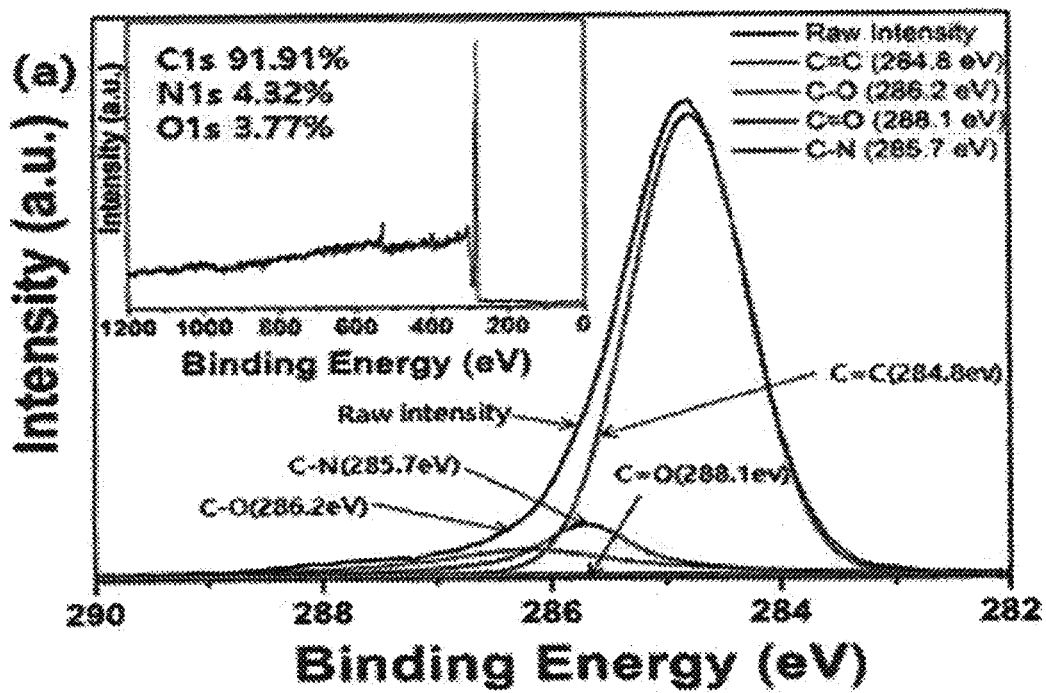
FIGS. 4A-B shows results of XPS analysis of the graphene-based compound according to an embodiment of the present invention.
Figure 4:
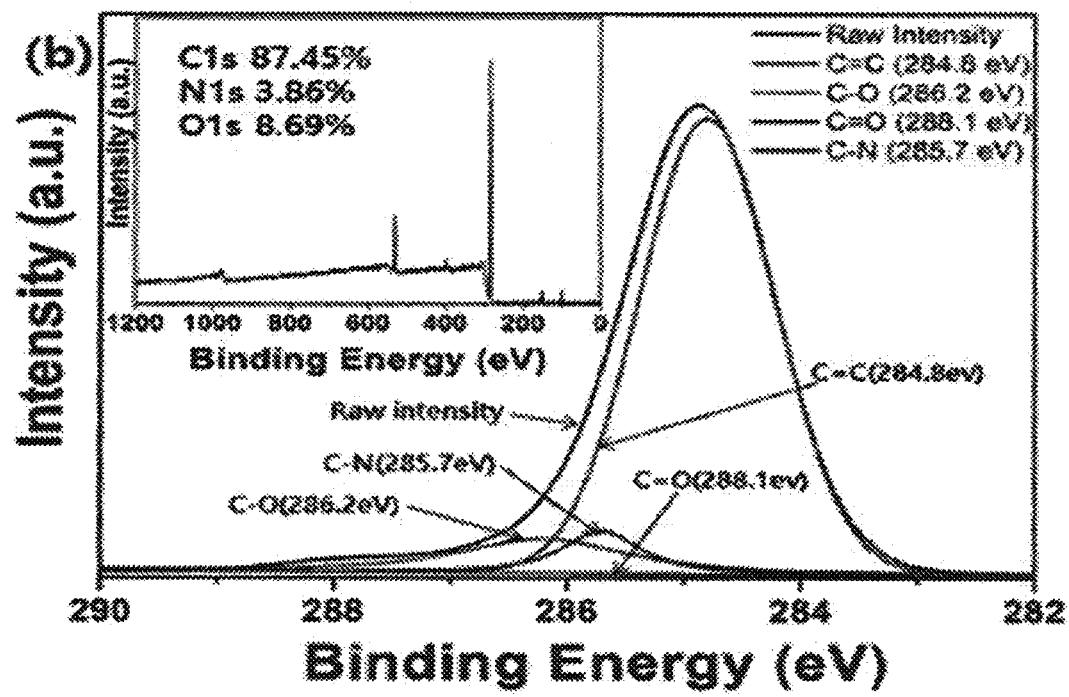

As shown in FIG. 4a), when the graphene-based compound of Example 1 was analyzed by XPS, the compound was composed of 91.91 element % of carbon, 4.32 element % of nitrogen, and 3.77 element % of oxygen, which could be confirmed that a graphene-based compound including a significantly low content of oxygen to substantially free from defects was prepared. Further, as shown in FIG. 4b), when the graphene-based compound having an average particle diameter of 70 nm prepared by changing the reaction temperature of 150° C. to 170° C. in Example 1 was also analyzed by XPS, the compound was composed of 87.45 element % of carbon, 3.86 element % of nitrogen, and 8.69 element % of oxygen, which could be confirmed that a graphene-based compound having a significantly low content of oxygen to be substantially free from defects was prepared even though the size was changed. Thus, it could be confirmed that as compared to the conventional graphene-based compounds having a high oxygen content of 40 to 50 atom %, the graphene-based compound of the present invention had a significantly lower oxygen content to exhibit monocrystalline characteristics.

Figure 9:
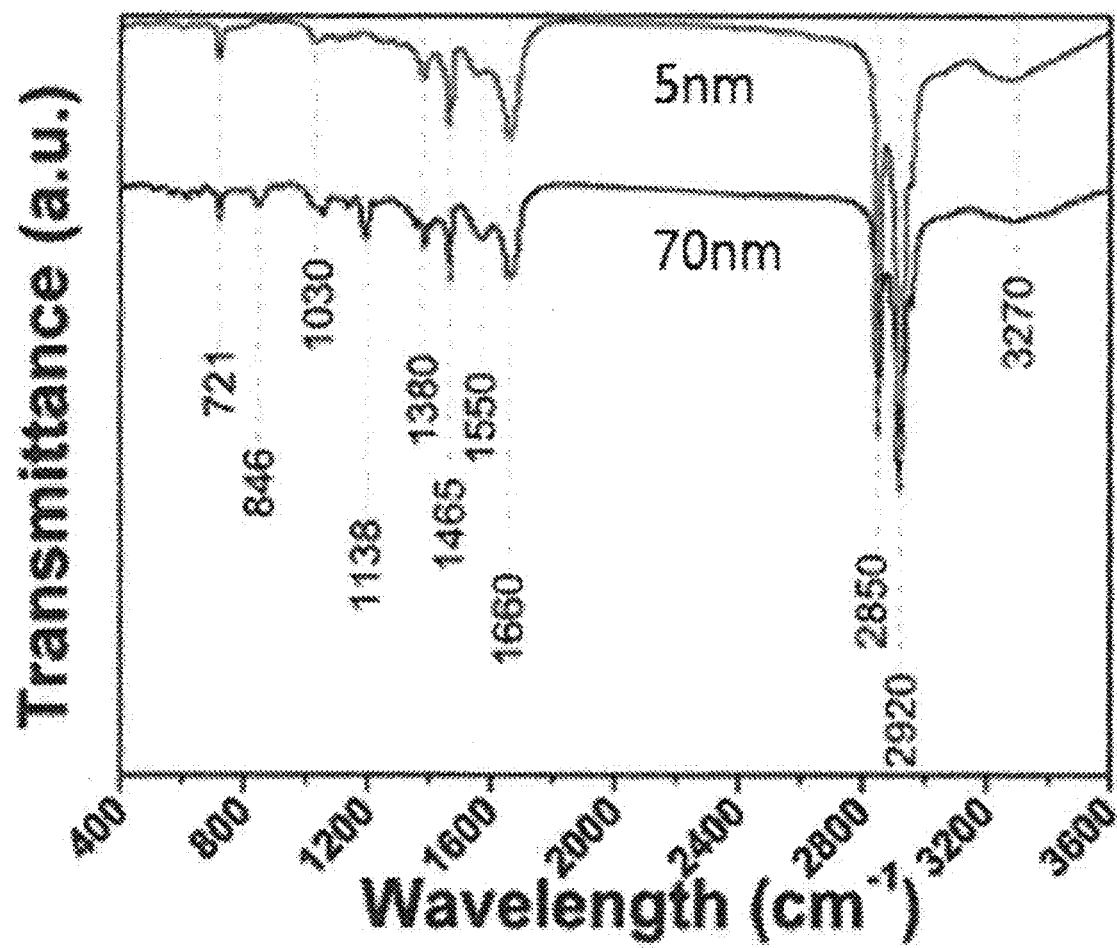
FIG. 9 shows FT-IR analysis results according to an average particle diameter of the graphene-based compound according to an embodiment of the present invention.

As shown in FIG. 9, it could be confirmed that when graphene-based compounds each having an average particle size of 5 nm and 70 nm according to the present invention were analyzed by FT-IR, the epoxide stretching peak shown at 846.1138 $cm^{-1}$ did not occur in the graphene-based compound having a small average particle diameter of 5 nm. As a result, it could be confirmed that the oxidation region was not present in the surface region of the graphene-based compound according to the present invention, i.e., there was substantially no defect in the surface region. Further, in the graphene-based compound having a relatively large average particle diameter of 70 nm, the epoxide stretching peak shown at 846.1138 $cm^{-1}$ occurred to a slight extent, but it was interpreted to the extent that there was substantially no defect in the surface region.

Further, as shown in FIG. 9, a ratio ($I_{CC}/I_{OH}$) of the —OH absorption peak height ($I_{OH}$) shown at 3270 $cm^{-1}$ to the aromatic ring C═C stretch absorption peak height ($I_{CC}$)

shown at 1660 cm$^{-1}$ was calculated by the FT-IR analysis of the graphene-based compounds each having an average particle diameter of 5 nm and 70 nm according to the present invention. Here, it was confirmed that the graphene-based compound having an average particle diameter of 5 nm satisfied $I_{CC}/I_{OH}$ of 1.944 and the graphene-based compound having an average particle diameter of 5 nm satisfied $I_{CC}/I_{OH}$ of 2.567. Thus, it could be confirmed that the graphene-based compound according to the present invention had excellent quality without being substantially free from defects.

[Experimental Example 4] Luminescence Characteristics of Graphene Quantum Dot

Figure 6:
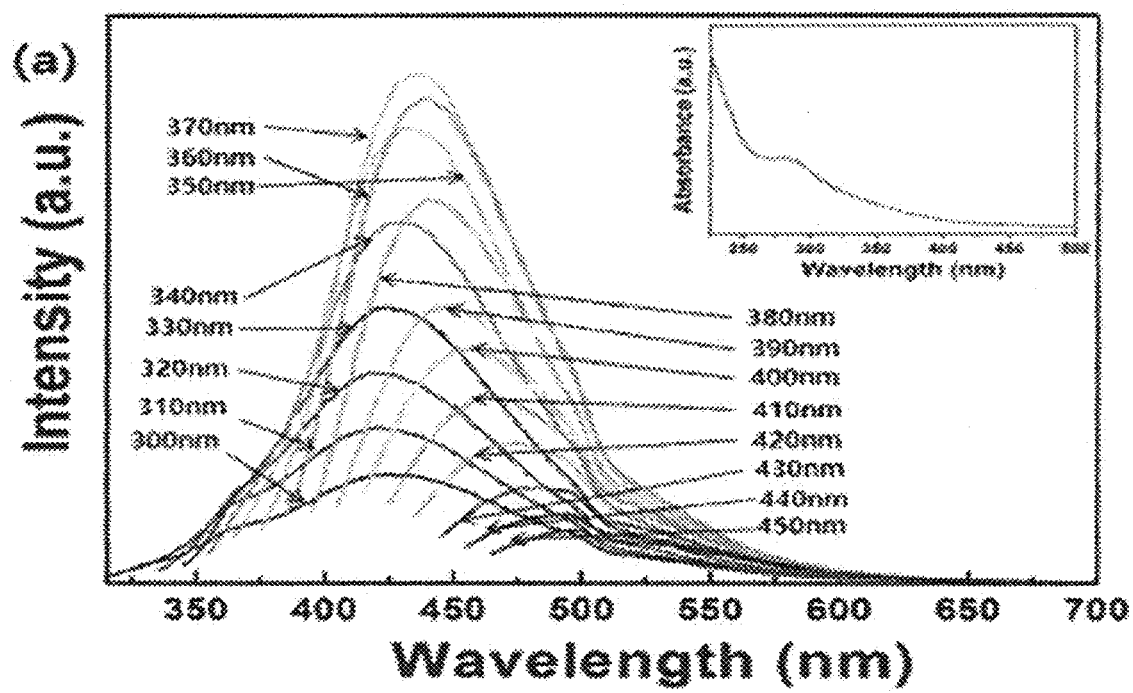
FIGS. 6A-6B shows results of PL characteristics of the graphene-based compound according to an embodiment of the present invention.
Figure 6:
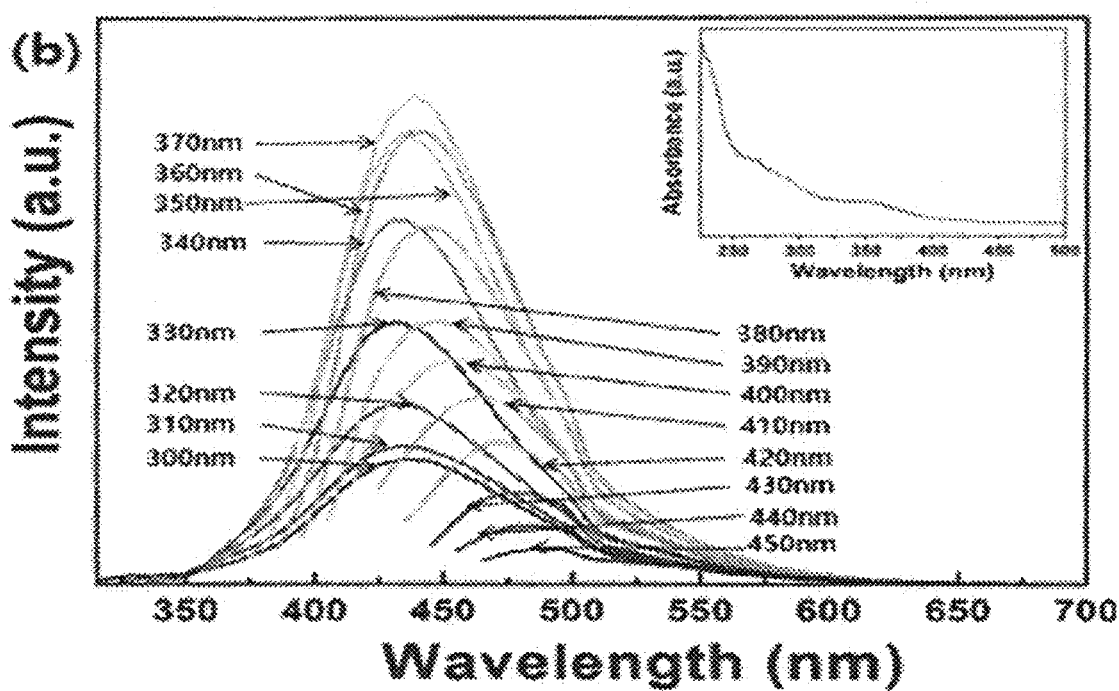
Figure 7:
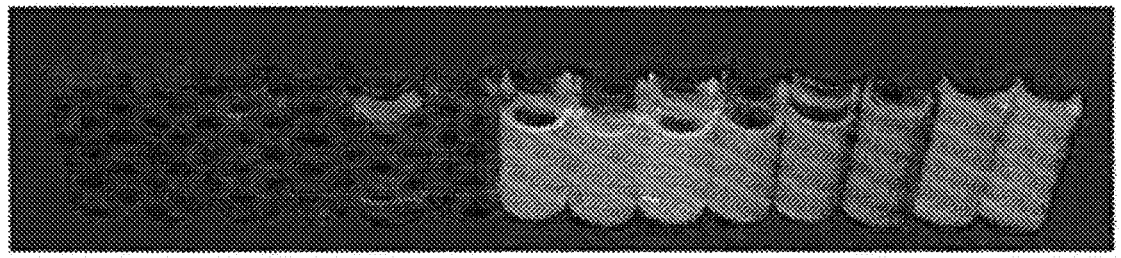
FIG. 7 is an image showing luminescence characteristics observed after UV irradiation of the graphene-based compound according to an embodiment of the present invention.

As shown in FIG. 6, it could be confirmed that when the PL characteristic of the graphene quantum dot of Example 1 was observed, the maximum luminescence emission peak appeared at an excitation wavelength of 350 to 390 nm. Here, it could be confirmed that the maximum luminescence peak was exhibited at 420 to 450 nm, and that the full width at half maximum (FWHM) of the luminescence peak was as narrow as 100 nm or less. As described above, the maximum luminescence emission peak appeared at an excitation wavelength of 350 to 390 nm was exhibited at 420 to 450 nm, and it could be confirmed that the graphene quantum dot according to the present invention showed blue luminescence characteristics and had excellent color purity, as shown in FIG. 7.

Figure 8:
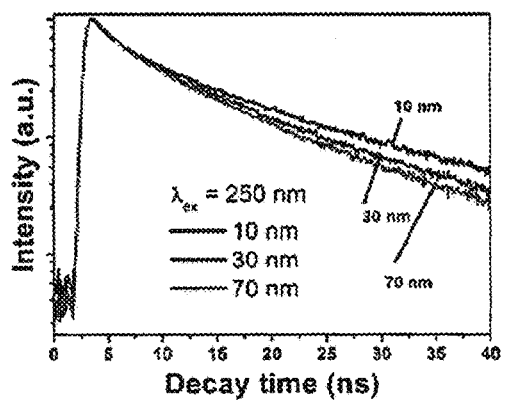
Figure 8:
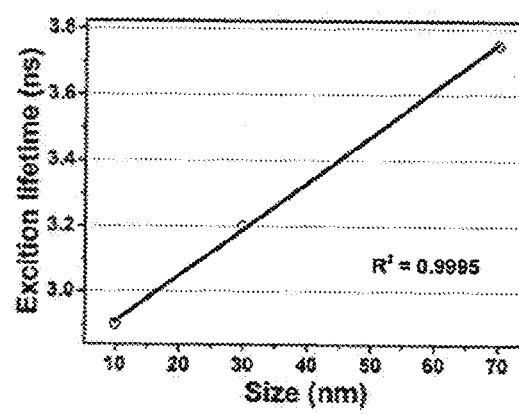
Figure 8:
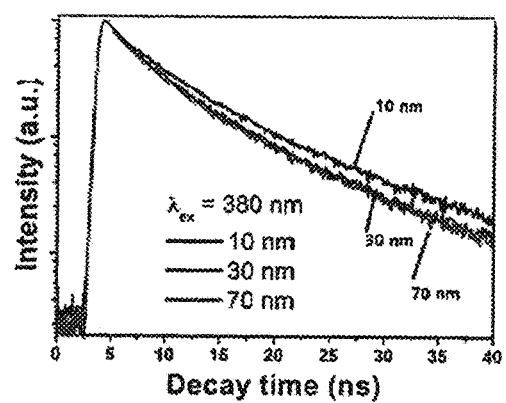
Figure 8:
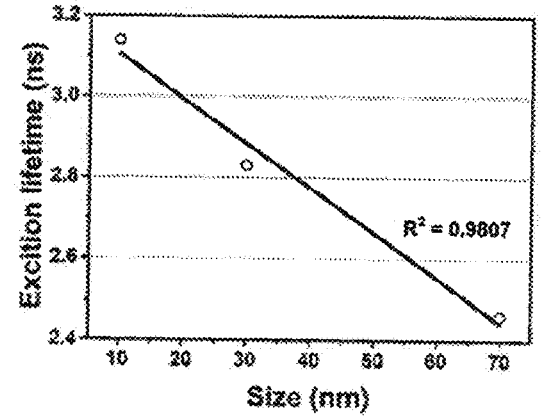

The exciton lifetime of the graphene quantum dot according to the present invention was measured depending on size, at 300K in excitation light having a wavelength of 280 nm and 350 nm in a 5 mg/mL solution on a methanol solvent through time-resolved photoluminescence (TRPL). As shown in FIG. 8, even if the size of the graphene quantum dot was changed, it could be confirmed that the exciton lifetime was 4 ns or less, which was very short. The graphene quantum dot according to the present invention has very high luminescence quantum efficiency due to the short exciton lifetime.

Further, a graphene quantum dot was additionally produced by using a solution in which micelles were formed by adding a surfactant to an aqueous solution containing 10 wt % of D-glucose dissolved therein. However, it was confirmed that it was difficult to control the size and the produced graphene quantum dot had poor crystallinity.

Further, a graphene oxide was first prepared by including the carbon source and the acid, followed by pyrolysis together with hydrocarbyl amine to produce the graphene quantum dot. However, it was confirmed that defects occurred during the pyrolysis, an additional reducing agent, or the like, was required to remove the defects, and the graphene quantum dot having poor crystallinity was produced since the defects were not completely removed.

It could be confirmed that the graphene quantum dot according to the present invention had monocrystallinity and monodispersibility with high degree of crystallinity, was controllable in size, and had excellent luminescence characteristics. The graphene quantum dot has excellent luminescence efficiency to be capable of exhibiting remarkably improved characteristics when applied to organic light emitting devices such as an organic light emitting diode, and the like.

The graphene-based compound according to the present invention may have a uniform average particle diameter, and may achieve monodispersibility and monocrystallinity with a high degree of crystallinity.

The graphene-based compound according to the present invention may include a monocrystalline graphene quantum dot to have excellent luminescence properties and quantum efficiency.

The composition for preparing a graphene-based compound according to the present invention is provided in a single phase, and is simple in synthesis and separation, thereby enabling mass production with excellent economic efficiency.

The method for preparing a graphene-based compound according to the present invention is capable of controlling the size and shape of the graphene-based compound.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scopes and spirit of the invention.

What is claimed is:

1. A single-phase composition for preparing a graphene-based compound comprising:
   hydrocarbyl amine, a hydroxyl group-containing carbon source, an acid, and a $C_6$-$C_{20}$ hydrocarbyl alcohol-based solvent;
   wherein the single-phase composition includes the hydroxyl group-containing carbon source and the hydrocarbyl amine in a molar ratio of 1:1 to 1:20.

2. The single-phase composition for preparing a graphene-based compound of claim 1, wherein the hydroxyl group-containing carbon source includes a saccharide-based compound.

3. The single-phase composition for preparing a graphene-based compound of claim 2, wherein the saccharide-based compound includes a monosaccharide compound.

4. The single-phase composition for preparing a graphene-based compound of claim 1, wherein the acid includes an organic acid.

5. The single-phase composition for preparing a graphene-based compound of claim 1, wherein the pH of the composition ranges from 4 to 7.

6. The single-phase composition for preparing a graphene-based compound of claim 1, wherein the graphene-based compound includes a graphene quantum dot.

7. A method for preparing a graphene-based compound comprising:
   (a) preparing a reaction mixture including hydrocarbyl amine, a hydroxyl group-containing carbon source, an acid, and a hydrocarbyl alcohol-based solvent;
   (b) heating the reaction mixture;
   wherein the reaction mixture of step (a) includes the hydroxyl group-containing carbon source and the hydrocarbyl amine in a molar ratio of 1:1 to 1:20.

8. The method of claim 7, wherein a reaction temperature in the (b) heating ranges from 60 to 300° C.

9. The method of claim 7, further comprising:
   mixing a reaction product obtained after the (b) heating with a (C1-C3) alcohol-based solvent.

10. The method of claim 7, further comprising:
    cooling the reaction product obtained after the (b) heating to a melting point or less of the hydrocarbyl amine.

11. The method of claim 7, wherein the reaction mixture of the (a) preparing has a single phase.

* * * * *